United States Patent Office 2,816,087
Patented Dec. 10, 1957

2,816,087

MODIFIED POLYVINYL ALCOHOL POLYMERS AND THEIR PREPARATION

Harry W. Coover, Jr., Kingsport, Tenn., assignor to Eastman Kodak Company, Rochester, N. Y., a corporation of New Jersey No Drawing. Application February 10, 1954, Serial No. 409,512

10 Claims. (Cl. 260—45.5)

This invention relates to the preparation of new modified polyvinyl alcohol polymers, and is particularly concerned with the preparation of graft copolymers of vinylidene chloride and polyvinyl alcohol.

It is well known that fibers spun from solutions of polyvinyl alcohol have excellent characteristics, including high tenacities and extensibilities, high softening points, good dyeability, and insolubility in most organic solvents. Polyvinyl alcohol, however, is quite water soluble and hence is unsuitable for use in making general purpose fibers. A number of methods have been proposed for insolubilizing polyvinyl alcohol, but such processes are usually expensive and hence do not lend themselves to commercial use. It is desirable also to maintain the desirable properties of the polyvinyl alcohol, and in some cases this cannot be done when the polyvinyl alcohol is insolubilized.

Polyvinyl alcohol is usually prepared by the hydrolysis of a polyvinyl ester, acetal, or ether using either acid or base to effect the hydrolysis. This indirect method is necessary because the monomeric form of the alcohol does not exist. A number of methods for preparation of polyvinyl alcohol are known to the art. One of the early methods was that of Herrmann et al., U. S. 1,672,156, wherein vinyl esters were hydrolyzed to polyvinyl alcohol by means of alkali. An improved method for preparing polyvinyl alcohol was disclosed in Noller, U. S. 1,897,856, wherein the hydrolysis was effected with alcoholic alkali and water. The acid hydrolysis of a polyvinyl ester to polyvinyl alcohol using alcohol was disclosed in Stamatoff, U. S. 2,478,431. A continuous process for manufacturing polyvinyl alcohol on a commercial scale was disclosed in Waugh et al., U. S. 2,642,419. In these various methods of preparing polyvinyl alcohol, the polyvinyl ester which is used can be hydrolyzed to any desired degree from about 10% hydrolysis up to substantially 100% hydrolysis. This invention is concerned with those polyvinyl alcohol compounds wherein the hydrolysis has been carried out to a point where the polymeric material is readily water soluble. One of the most common methods which has been suggested for insolubilizing polyvinyl alcohol is to react it with an aldehyde such as formaldehyde. This is relatively expensive, however, and hence is not particularly suitable for use in the preparation of synthetic fibers. Other methods which have been suggested for hardening polyvinyl alcohol include a superficial hardening with Congo Red dye, treatment with cuprammonium hydroxide solution, or chlorination with hydrogen chloride. The method of insolubilizing polyvinyl alcohol with formaldehyde is disclosed in Voss, German Patent 526,497.

It is an object of this invention to provide a new, simple, and relatively inexpensive method for modifying polyvinyl alcohol so as to render it water insoluble without adversely affecting the desirable properties of the polyvinyl alcohol such as its high tenacity, high extensibility, high softening point, good dyeability, and insolubility in many organic solvents.

Another object of the invention is to provide a new class of modified polymers prepared by grafting vinylidene chloride with polyvinyl alcohol.

Another object of the invention is to provide a new method for treating polyvinyl hydrolysates so as to obtain water-insoluble materials having a high degree of flame resistance, and suitable for the preparation of synthetic fibers and clear films.

Another object of the invention is to provide graft copolymers prepared by graft copolymerizing vinylidene chloride alone or in combination with another monoethylenic monomer with polymeric material containing sufficient polyvinyl alcohol to render it water soluble. Other objects will be apparent from the description and claims which follow.

These and other objects are attained by means of this invention, which comprises graft copolymerizing monomeric material comprising vinylidene chloride with water-soluble polymeric material comprising polyvinyl alcohol in such proportions that a water-insoluble graft copolymer is formed having the desirable physical characteristics of polyvinyl alcohol. In the process embodying this invention, the polyvinyl alcohol amounts to from 15 to 90% by weight, and the vinylidene chloride amounts to from 10 to 85% by weight of the combined weight of monomeric material and polymeric material employed in the graft copolymerization. Preferably the polymeric material is a preformed water-soluble polymer which consists predominantly of polyvinyl alcohol, and which can consist of as much as from 85 to 100% polyvinyl alcohol. In some cases, however, the polymeric material can be a polyvinyl ester or similar polyvinyl polymer which is hydrolyzed only until good water solubility is obtained. Thus the invention is applicable employing polymeric material containing as little as 15% by weight of polyvinyl alcohol based on the combined weight of polymeric material and monomeric material. The polyvinyl alcohol which is employed can be prepared in any well known manner such as by acid or alkaline hydrolysis of a polyvinyl ester such as polyvinyl acetate, polyvinyl butyrate, or the like, or polyvinyl acetal, or a polyvinyl ether.

In accordance with this invention, the polymeric material containing polyvinyl alcohol is admixed with a monomeric material which contains at least 50% by weight of vinylidene chloride, and the mixture is graft copolymerized by heating in the presence of a polymerization catalyst until a modified polymer is obtained. The polymerization is desirably effected in a dispersion, which can be either an emulsion or a solution. In the preferred embodiment, the polymerization reaction is effected in aqueous medium, and preferably in an aqueous emulsion, although the reaction can be effected in a mixed system including both water and an organic solvent such as alcohol, or in a single phase organic solvent if desired, and in accordance with well known polymerization practice.

A monomeric material employed in practicing this invention consists predominantly of vinylidene chloride and can consist entirely of vinylidene chloride. If desired, however, the vinylidene chloride can be admixed with one or more other monoethylenically unsaturated polymerizable monomers containing a —CH=C< group. This other monomeric material can be any of the well known monomers including such materials as acrylonitrile, styrene, methacrylonitrile, α-methylstyrene, p-acetaminostyrene, α-acetoxystyrene, vinyl chloride, methyl vinyl ether, isopropyl vinyl ether, isopropenyl methyl ketone, ethyl isopropenyl ketone, methylvinyl ketone, ethylvinyl ketone, dimethyl maleate, diethyl maleate, diisopropyl maleate, dimethyl fumarate, diethyl fumarate, diisopropyl fumarate, acrylic acid, methacrylic acid, fumaronitrile, N-vinyl phthalimide, ethylene, and the like.

A particularly useful group of monomers for use in conjunction with vinylidene chloride are the materials having a —CH=C< group, and including the vinyl pyridines, acrylamides, maleamides, fumaramides, itaconamides, citraconamides, maleamates, fumaramates, itaconamates, citraconamates, acrylates, and vinyl esters.

As acrylamides, I can advantageously use in my invention those represented by the following general formula:

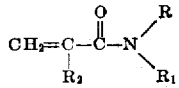

wherein R and $R_1$ each represents a hydrogen atom or an alkyl group containing from 1 to 4 carbon atoms (e. g. methyl, ethyl, propyl, isopropyl, butyl, isobutyl, etc. groups) and $R_2$ represents a hydrogen atom or a methyl group. Typical acrylamides include, for example, acrylamide, N-methylacrylamide, N-ethylacrylamide, N-isopropylacrylamide, N-n-butylacrylamide, N,N-dimethylacrylamide, N,N-diethylacrylamide, methacrylamide, N-methylmethacrylamide, N-ethylmethacrylamide, N-isopropylmethacrylamide, N,N-dimethylmethacrylamide, etc.

As maleamides, I can advantageously use those represented by the following general formula:

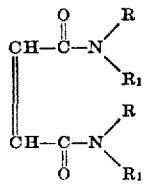

wherein R and $R_1$ each have the values given above. Typical maleamides include, for example, maleamide, N-methylmaleamide, N - ethylmaleamide, N - propylmaleamide, N-isopropylmaleamide, N-n-butylmaleamide, N,N'-dimethylmaleamide, N,N'-diethylmaleamide, N,N'-di-n-butylmaleamide, N,N'-methylethylmaleamide, N,N'-tetramethylmaleamide, N,N'-tetraethylmaleamide, N,N'-dimethyl-N,N'-diethylmaleamide, etc.

As fumaramides, I can advantageously use those represented by the following general formula:

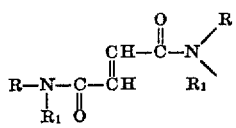

wherein R and $R_1$ each have the values given above. Typical fumaramides include, for example, fumaramide, N-methylfumaramide, N-ethylfumaramide, N-propylfumaramide, N - isopropylfumaramide, N - n - butylfumaramide, N,N' - dimethylfumaramide, N,N' - diethylfumaramide, N,N' - di - n - butylfumaramide, N - ethyl - N'-methylfumaramide, N - n - butyl - N' - methylfumaramide, N,N' - tetramethylfumaramide, N,N' - tetraethylfumaramide, N,N - diethyl - N',N' - dimethylfumaramide, etc.

As itaconamides, I can advantageously employ those represented by the following general formula:

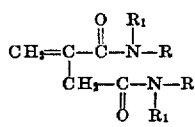

wherein R and $R_1$ each have the values given above. Typical itaconamides include, for example, itaconamide, N - methylitaconamide, N - ethylitaconamide, N - propylitaconamide, N,N'-dimethylitaconamide, N,N'-diethylitaconamide, etc.

As citraconamides, I can advantageously employ those represented by the following general formula:

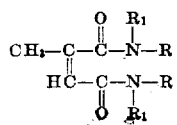

wherein R and $R_1$ each have the values given above. Typical citraconamides include, for example, citraconamide, N - methylcitraconamide, N - ethylcitraconamide, N - n - butylcitraconamide, N,N' - dimethylcitraconamide, N,N' - diethylcitraconamide, the N,N' - butylcitraconamides, N,N'-tetramethylcitraconamide, etc.

The maleamates useful in practicing my invention comprise those represented by the following general formula:

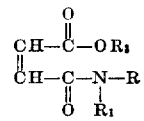

wherein R and $R_1$ each have the values given above, and $R_3$ represents an alkyl group of from 1 to 4 carbon atoms (e. g. methyl, ethyl, propyl, isopropyl, n-butyl, isobutyl, etc.). Typical are methyl maleamate, propyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, I can advantageously employ those represented by the following general formula:

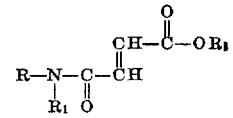

wherein R, $R_1$ and $R_3$ each have the values given above. Typical are methyl fumaramate, ethyl fumaramate, propyl fumaramate, n-butyl fumaramate, methyl N-methylfumaramate, ethyl N - methylfumaramate, the butyl N-methylfumaramates, methyl N - dimethylfumaramates, ethyl N - dimethylfumaramates, n - butyl N - dimethylfumaramate, the methyl N - dibutylfumaramates, etc.

As itaconamates, I can advantageously employ those represented by the following general formulas:

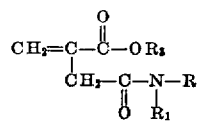

and

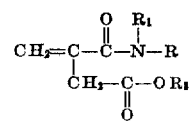

wherein R, $R_1$ and $R_3$ each have the values given above. Typical itaconamates include, for example, methyl itaconamate, ethyl itaconamate, propyl itaconamate, the butyl itaconamates, methyl N - methylitaconamate, ethyl N-methylitaconamate, propyl N - methylitaconamate, n-butyl N - methylitaconamate, methyl N - dimethylitaconamate, ethyl N - dimethylitaconamate, n - butyl N - dimethylitaconamate, the methyl N - dibutylitaconamates, etc.

As citraconamates, I can advantageously employ those represented by the following general formulas:

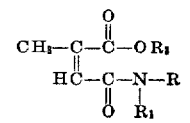

and

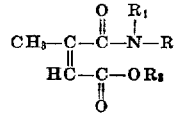

wherein R, $R_1$ and $R_3$ each have the values given above. Typical citraconamates include, for example, methyl citraconamate, ethyl citraconamate, propyl citraconamate, the butyl citraconamates, methyl N - methylcitraconamate, ethyl N - methylcitraconamates, propyl N - methylcitraconamates, n - butyl N - methylcitraconamate, methyl N-dimethylcitraconamate, ethyl N - dimethylcitraconamate, n - butyl N - dimethylcitraconamate, the methyl N - dibutylcitraconamates, etc.

As acrylates, I can advantageously employ those represented by the following general formula:

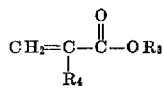

wherein $R_3$ has the values given above and $R_4$ represents a hydrogen atom, a methyl group, or an ethyl group. Typical acrylates include, for example, methyl acrylate, ethyl acrylate, propyl acrylate, isopropyl acrylate, butyl acrylate, methyl methacrylate, ethyl methacrylate, propyl methacrylate, n-butyl methacrylate, isopropyl methacrylate, methyl ethacrylate, ethyl ethacrylate, etc.

As vinyl esters, I can advantageously employ those represented by the following general formula:

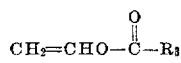

wherein $R_3$ has the values given above. Typical vinyl esters, include, for example, vinyl acetate, vinyl propionate, vinyl butyrate, vinyl isobutyrate, etc.

When such monomers are employed in conjunction with the vinylidene chloride, they form a minor proportion of the monomeric material which is graft copolymerized with the polyvinyl alcohol-containing polymeric material.

Similarly, the polyvinyl alcohol can be prepared by partial or substantially complete hydrolysis of a vinyl ester, acetal, or ether, or copolymer of a vinyl ester, acetal, or ether with another monoethylenically unsaturated compound which is copolymerizable therewith as typified by the monomers set out hereinabove.

In effecting the graft copolymerization, the polymeric material consisting predominantly of polyvinyl alcohol is heated with the monomeric material consisting predominantly of vinylidene chloride until the monomeric material has polymerized to a substantial degree to give a modified polymer which upon being dried and oriented exhibits water insolubility. The polymers embodying this invention can be prepared over a wide range of proportions of from 15 to 90% polyvinyl alcohol, and from 10 to 85% vinylidene chloride. The polymerization reaction can be effected at temperatures of from about 25° C. to about 100° C., and the course of the polymerization is facilitated by the use of elevated temperatures. Temperatures of from 40° to 70° C. are particularly desirable, although higher or lower temperatures can be used. The polymerization is further accelerated by employing in the polymerization mixture at least one of the catalysts which is known to accelerate the polymerization of vinyl compounds. Typical catalysts include the organic and inorganic peroxide polymerization catalysts, such as hydrogen peroxide, persulfates such as sodium persulfate, potassium persulfate, and ammonium persulfate, perborates such as sodium perborate, potassium perborate, and ammonium perborate, percarbonates such as sodium percarbonate and potassium percarbonate, ozone, peracetic acid, triacetone peroxide, urea peroxide, acetyl peroxide, benzoyl peroxide, acetyl benzoyl peroxide, lauroyl peroxide, and the like. The quantity of catalyst which is used can be varied in accordance with usual polymerization practices, although amounts of from about 0.01% to about 2% by weight based on the weight of monomeric material is usually sufficient.

When the polymerization is effected in aqueous emulsion, any of the well known emulsifying agents can be used in the polymerization mixture. Typical emulsifying agents which are suitable include the alkali metal salts of fatty alcohol sulfates such as sodium lauryl sulfate, alkali metal salts of aromatic sulfonic acids such as sodium isobutyl naphthalene sulfonate; sulfosuccinic acid esters or their salts or amine addition products; alkali metal salts of fatty acids containing from 12 to 20 carbon atoms, sulfonated fatty acid amids or their alkali metal salts, the complex reaction products obtained by reacting ethylene oxide with aliphatic alcohols and amines; and similar well known emulsifying agents. The polymerization can also be carried out in the presence of chain regulators such as hexyl, octyl, lauryl or myristyl mercaptans, and if desired, reducing agents such as alkali metabisulfites can be added to reduce the polymerization time.

The emulsions which are formed by homopolymerizing or copolymerizing the vinylidene chloride in the presence of the preformed water-soluble monomer can be wet or dry spun into fibers which have properties which are equivalent to, and in some cases better than, those of polyvinyl alcohol fibers, and which have the additional important attribute of being water insoluble. These emulsions can also be cast into films which can be cured and oriented to give clear films which are flame resistant and insoluble in hot and cold water and most organic solvents.

The fibers or films formed by simple evaporation of the emulsions embodying this invention are much more crystalline than the corresponding unmodified polyvinyl alcohol. When the polymers of this invention are hot drafted at temperatures above 100° C., the degree of crystallinity is increased even further, and a high degree of orientation results. The drafted product has a high tenacity, a high softening point, and is insoluble in hot and cold water and in most organic solvents. It is flame resistant and has good affinity for most classes of dyes.

In practicing the invention, the modified polymer which is formed can contain some acetyl or other hydrophobic groups. The polymeric material which is modified should, however, contain sufficient polyvinyl alcohol to be completely soluble in water. The polymers of this invention can be prepared in either a batch or a continuous process. The polymerization can be carried to any desired degree sufficient to impart water insolubility to the product, although for economic reasons the polymerization is desirably carried to at least 70%, and usually to from 80 to substantially 100%. When a continuous process is employed, however, a lower conversion can be effected, and the unreacted material can be recycled in the process.

The invention is illustrated by the following examples of certain preferred embodiments thereof. The examples are included for purposes of illustration, however, and it is not intended that the scope of the invention shall be limited thereby unless otherwise specifically indicated, since the invention is applicable for preparing any of the modified polymers as described herein.

*Example 1*

To a cooled solution of 12 g. of polyvinyl alcohol (98–100% hydrolysis) in 80 ml. of distilled water, 0.25 g. of a surfactant of the formula

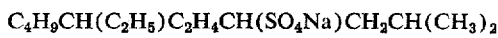

(Tergitol–4), 8 g. of vinylidene chloride, 0.08 g. of potassium persulfate, and 0.08 g. of potassium metabisulfite were added. The reaction mixture was allowed to polymerize in a pressure vessel at 45° C. for 16 hours. The resultant emulsion, when spun into a coagulating bath, gave fibers which had a tenacity of 2.8 g. per denier and were resistant to burning.

*Example 2*

To a cooled solution of 14 g. of polyvinyl alcohol (98–100% hydrolysis) in 180 ml. of distilled water, 0.5 g. of a surfactant (Tergitol–4) defined in Example 1, 6 g. of vinylidene chloride, 0.12 g. of potassium persulfate, and 0.06 g. of potassium metabisulfite were added. The reaction mixture was allowed to polymerize at 35° C. for 16 hours. The resulting emulsion could be cast into a film which, after drafting, was highly crystalline, hot water-insoluble, and high softening.

Example 3

To 5 g. of polyvinyl alcohol (89–90% hydrolysis) in 89.6 ml. of distilled water, 0.25 g. of a sulfonated ether surfactant (Triton X–100), 4 g. of vinylidene chloride, 0.1 g. of potassium persulfate, 0.6 g. of methyl acrylate, 0.4 g. of acrylic acid, and 0.05 g. of potassium metabisulfite were added. The reaction mixture was allowed to polymerize at 35° C. for 16 hours. Films cast from the resultant emulsion were clear, tough, and after orientation were hot water-insoluble and flame-resistant.

Example 4

Eight and five-tenths g. of vinylidene chloride were added to 1.5 g. of polyvinyl alcohol (98–100% hydrolyzed) and 0.25 g. of a sulfonated ether surfactant (Triton X–100) in 90 ml. of water. Potassium persulfate (0.17 g.) and potassium metabisulfite (0.085 g.) were added, and the emulsion was polymerized at 25° for 16 hours. Fibers spun from the resulting emulsion, after being drafted 500%, had a tenacity of 20 g. per denier, were flameproof, and were dyeable with conventional dyes.

Example 5

To a solution of 9.0 g. of polyvinyl alcohol (98–100% hydrolyzed), 0.1 g. of Tergitol No. 4 surfactant as defined in Example 1 and 90 ml. of distilled water were added 0.01 g. of potassium persulfate, 0.5 g. of vinylidene chloride, 0.5 g. of methyl acrylate, and 0.01 g. of potassium metabisulfite. The reaction mixture was allowed to polymerize at 35° C. for 15 hours. Films cast from the resultant polymer emulsion were clear and tough and became hot water-insoluble after curing for 25 minutes at 180° C.

Example 6

A copolymer consisting of 70 parts of vinyl acetate and 30 parts of isopropenyl acetate (prepared according to the method of Stanin and Dickey U. S. Patent 2,571,777, Example No. 2) was hydrolyzed with dilute mineral acid until it became soluble in water. To a cooled solution of 14 g. of this material in 180 ml. of water, 0.5 g. of a surfactant (Tergitol–4), 6 g. of vinylidene chloride, 0.12 g. of potassium persulfate, and 0.06 g. of potassium metabisulfite were added. The reaction mixture was allowed to polymerize at 35° C. for 16 hours. The resulting emulsion could be cast into a film which, after drafting, had a high tenacity and was water-insoluble.

The polymers embodying this invention can thus be employed for making clear films as well as synthetic fibers. These films can be used as a film base in the manufacture of photosensitive materials such as photographic film and photosensitive papers. They can be used in the preparation of either black-and-white or color film with advantageous results. The water insolubility of the films makes their use in such applications possible in contrast to polyvinyl alcohol films, which are too water soluble for such use.

In the preparation of films or fibers using the compositions of this invention, the emulsion obtained from the process can be used directly, or the polymer can be isolated from the reaction mixture and thereafter dissolved in a suitable solvent such as dimethyl formamide, ethylene carbamate, N,N-dimethyl acetamide, or similar solvent ordinarily used in spinning of fibers. The amount of polymer which is dissolved in the solvent can be varied from about 10 to 40% by weight. Since the polymerization emulsion can be used directly, however, the isolation and subsequent solution of the modified polymer is usually not necessary.

Thus by means of this invention modified polymers are readily prepared having the desirable properties of polyvinyl alcohol such as high tenacity, high extensibility, high softening point, and good dyeability. In addition, the modified polymers are insoluble in both hot and cold water and in most organic solvents, and hence can be employed in applications wherein polyvinyl alcohol is unsuitable. The excellent flame resistance of the polymers embodying this invention make them particularly useful in applications wherein such resistance is a desirable safety factor, such as in the manufacture of films.

Although the invention has been described in considerable detail with particular reference to certain preferred embodiments thereof, variations and modifications can be effected within the spirit and scope of the invention as described hereinabove, and as defined in the appended claims.

I claim:

1. The method which comprises heating in the presence of a peroxy polymerization catalyst an aqueous dispersion containing a mixture of (1) a preformed water-soluble polymeric material consisting predominantly of polyvinyl alcohol, said polyvinyl alcohol amounting to from 15 to 90° of the weight of said mixture, and (2) vinylidene chloride in an amount of from 10 to 85% of the weight of said mixture.

2. The method which comprises heating in the presence of a peroxy polymerization catalyst an aqueous dispersion of a water-soluble hydrolysate of a vinyl acetate polymer and vinylidene chloride and thereby graft copolymerizing said vinylidene chloride with said hydrolysate, said hydrolysate containing from 15 to 90% by weight of polyvinyl alcohol based on the combined weight of said hydrolysate and said vinylidene chloride, said vinylidene chloride amounting to from 10 to 85% of said combined weight of hydrolysate and vinylidene chloride.

3. The method which comprises heating in the presence of a peroxy polymerization catalyst an aqueous dispersion of (1) a water-soluble hydrolysate of a copolymer of a vinyl ester and another monoethylenically unsaturated monomer, and (2) monoethylenically unsaturated monomeric material consisting predominantly of vinylidene chloride, said hydrolysate containing polyvinyl alcohol in an amount of from 15 to 90% of the combined weight of said hydrolysate and said monomeric material, said vinylidene chloride amounting to from 10 to 85% of said combined weight.

4. The method which comprises heating in the presence of a peroxy polymerization catalyst an aqueous dispersion of (1) polymeric material consisting predominantly of polyvinyl alcohol, and (2) monomeric material consisting of a major proportion of vinylidene chloride and a minor proportion of a different monoethylenically unsaturated polymerizable monomer, and thereby forming a modified graft copolymer, said polyvinyl alcohol amounting to from 15 to 90% and said vinylidene chloride amounting to from 10 to 85% of the combined weight of said polymeric material and said monomeric material.

5. A water-insoluble graft copolymer of polymeric material comprising polyvinyl alcohol and monoethylenically unsaturated monomeric material comprising vinylidene chloride, wherein said polyvinyl alcohol amounts to from 15 to 90% and said vinylidene chloride amounts to from 10 to 85% of the combined weight of said polymeric and said monomeric material.

6. A water-insoluble graft copolymer of a water-soluble hydrolysate of a vinyl acetate polymer and vinylidene chloride, said hydrolysate containing from 15 to 90% by weight of polyvinyl alcohol based on the combined weight of said hydrolysate and said vinylidene chloride, said vinylidene chloride amounting to from 10 to 85% of said combined weight of hydrolysate and vinylidene chloride.

7. A water-insoluble graft copolymer of a water-soluble hydrolysate of a vinyl ester polymer and monomeric material consisting of at least 50% by weight of vinylidene chloride and not more than 50% by weight of a different monoethylenically unsaturated polymerizable monomer, said hydrolysate containing from 15 to 90% by weight of polyvinyl alcohol based on the combined weight of said hydrolysate and said monomeric material, said vinylidene chloride amounting to from 10 to 85% of said combined weight of hydrolyaste and monomeric material.

8. A water-insoluble graft copolymer of a water-soluble polymer comprising polyvinyl alcohol and monomeric material consisting of at least 50% by weight of vinylidene chloride and not more than 50% by weight of methyl acrylate, said polyvinyl alcohol amounting to from 15 to 90% and said vinylidene chloride amounting to from 10 to 85% of the combined weight of said water-soluble polymer and said monomeric material.

9. Synthetic fiber composed of the graft copolymer of claim 5.

10. Film composed of the graft copolymer of claim 5.

References Cited in the file of this patent

UNITED STATES PATENTS

| | | |
|---|---|---|
| 2,278,415 | Arnold | Apr. 7, 1942 |
| 2,404,817 | Strain | July 30, 1946 |
| 2,473,929 | Wilson | June 21, 1949 |
| 2,519,135 | Jacobson | Aug. 15, 1950 |
| 2,531,196 | Brubaker et al. | Nov. 21, 1950 |

FOREIGN PATENTS

| | | |
|---|---|---|
| 679,562 | Great Britain | Sept. 17, 1952 |

OTHER REFERENCES

Journal of Polymer Science, volume 8, pages 257–277 (1952), especially page 260.

U. S. DEPARTMENT OF COMMERCE
PATENT OFFICE

CERTIFICATE OF CORRECTION

Patent No. 2,816,087

December 10, 1957

Harry W. Coover, Jr.

It is hereby certified that error appears in the printed specification of the above numbered patent requiring correction and that the said Letters Patent should read as corrected below.

Column 8, line 21, for "15 to 90°" read -- 15 to 90% --; column 9, line 5, for "hydrolyaste" read -- hydrolysate --.

Signed and sealed this 4th day of March 1958.

(SEAL)
Attest:

KARL H. AXLINE

Attesting Officer

ROBERT C. WATSON
Commissioner of Patents